(12) United States Patent
Sawahata et al.

(10) Patent No.: US 8,546,991 B2
(45) Date of Patent: Oct. 1, 2013

(54) SYNCHRONOUS GENERATOR AND SYNCHRONOUS GENERATOR SYSTEM FOR REDUCING DISTORTION OF CURRENT WAVEFORM

(75) Inventors: Masanori Sawahata, Hitachi (JP); Kazuo Nishihama, Hitachi (JP); Hiroyuki Mikami, Hitachinaka (JP); Tetsuo Fujigaki, Hitachi (JP); Motonobu Iizuka, Hitachi (JP); Shuji Mizutani, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 608 days.

(21) Appl. No.: 12/507,101

(22) Filed: Jul. 22, 2009

(65) Prior Publication Data
US 2010/0026008 A1    Feb. 4, 2010

(30) Foreign Application Priority Data

Jul. 29, 2008    (JP) ................... 2008-195093

(51) Int. Cl.
*H02K 19/16* (2006.01)
*H02K 19/26* (2006.01)
*H02K 3/00* (2006.01)
*H02K 19/00* (2006.01)
*H02K 19/12* (2006.01)

(52) U.S. Cl.
USPC ........................ 310/179; 310/180; 310/195

(58) Field of Classification Search
USPC .............. 310/162, 179, 180, 184, 185, 195, 310/198, 199
IPC ................. H02K 19/00, 19/02, 19/10, 19/12, H02K 19/16, 19/26, 3/00, 3/12
See application file for complete search history.

(56) References Cited

U.S. PATENT DOCUMENTS

| 4,566,179 | A | * | 1/1986 | Sawyer et al. | 310/198 |
| 5,483,111 | A | * | 1/1996 | Kuznetsov | 310/12.21 |
| 5,590,003 | A | * | 12/1996 | Dunfield et al. | 310/179 |
| 5,654,602 | A | * | 8/1997 | Willyoung | 310/179 |
| 7,355,293 | B2 | * | 4/2008 | Bernhoff et al. | 290/53 |
| 2007/0278797 | A1 | | 12/2007 | Flannery et al. | |

FOREIGN PATENT DOCUMENTS

| JP | 3-270664 A | | 12/1991 |
| JP | 7-15901 A | | 1/1995 |
| JP | 07015901 A | * | 1/1995 |
| JP | 2005-304271 A | | 10/2005 |
| JP | 2005304271 A | * | 10/2005 |

OTHER PUBLICATIONS

Machine translation of JP07-015901.*
Machine translation of JP2005-304271.*
Transformers, Induction machines and AC commutator machines, Communicational Education Group of IEEJ, pp. 112, 1967.
S. Nonaka, Electric Machinery (I), Applied Electrical Engineering Treatise, Morikita Publishing Co. Ltd., p. 227, 1973.

* cited by examiner

*Primary Examiner* — Tran Nguyen
*Assistant Examiner* — Michael Andrews
(74) *Attorney, Agent, or Firm* — Mattingly & Malur, PC

(57) ABSTRACT

A synchronous generator 1 including a rotor having a field winding placed in the slots thereof and a stator having an armature winding placed in the slots thereof, wherein the value of the number of slots per two poles in stator minus the number of slots per two poles in rotor is equal to or greater than +9, or equal to or smaller than −9.

9 Claims, 14 Drawing Sheets

| | NUMBER OF SLOTS PER POLE PER PHASE IN STATOR | | 3 | 3.5 | 4 | 4.5 | 5 | 5.5 | 6 | 6.5 | 7 |
|---|---|---|---|---|---|---|---|---|---|---|---|
| NUMBER OF SLOTS PER POLE PER PHASE IN ROTOR | $N_2$ NUMBER OF SLOTS PER TWO POLES IN ROTOR | NUMBER OF SLOTS PER TWO POLES IN STATOR $N_1$ | 18 | 21 | 24 | 27 | 30 | 33 | 36 | 39 | 42 |
| 3 | | 18 | — | 3 | 6 | 9 | 12 | 15 | 18 | 21 | 24 |
| 3.5 | | 21 | -3 | — | 3 | 6 | 9 | 12 | 15 | 18 | 21 |
| 4 | | 24 | -6 | -3 | — | 3 | 6 | 9 | 12 | 15 | 18 |
| 4.5 | | 27 | -9 | -6 | -3 | — | 3 | 6 | 9 | 12 | 15 |
| 5 | | 30 | -12 | -9 | -6 | -3 | — | 3 | 6 | 9 | 12 |
| 5.5 | | 33 | -15 | -12 | -9 | -6 | -3 | — | 3 | 6 | 9 |
| 6 | | 36 | -18 | -15 | -12 | -9 | -6 | -3 | — | 3 | 6 |
| 6.5 | | 39 | -21 | -18 | -15 | -12 | -9 | -6 | -3 | — | 3 |
| 7 | | 42 | -24 | -21 | -18 | -15 | -12 | -9 | -6 | -3 | — |

FIG. 2

| NUMBER OF SLOTS PER POLE PER PHASE IN ROTOR | $N_2$ NUMBER OF SLOTS PER TWO POLES IN ROTOR / NUMBER OF SLOTS PER POLE PER PHASE IN STATOR → $N_1$ NUMBER OF SLOTS PER TWO POLES IN STATOR ↓ | 3 | 3.5 | 4 | 4.5 | 5 | 5.5 | 6 | 6.5 | 7 |
|---|---|---|---|---|---|---|---|---|---|---|
| | | 18 | 21 | 24 | 27 | 30 | 33 | 36 | 39 | 42 |
| 3 | 18 | — | 3 | 6 | 9 | 12 | 15 | 18 | 21 | 24 |
| 3.5 | 21 | -3 | — | 3 | 6 | 9 | 12 | 15 | 18 | 21 |
| 4 | 24 | -6 | -3 | — | 3 | 6 | 9 | 12 | 15 | 18 |
| 4.5 | 27 | -9 | -6 | -3 | — | 3 | 6 | 9 | 12 | 15 |
| 5 | 30 | -12 | -9 | -6 | -3 | — | 3 | 6 | 9 | 12 |
| 5.5 | 33 | -15 | -12 | -9 | -6 | -3 | — | 3 | 6 | 9 |
| 6 | 36 | -18 | -15 | -12 | -9 | -6 | -3 | — | 3 | 6 |
| 6.5 | 39 | -21 | -18 | -15 | -12 | -9 | -6 | -3 | — | 3 |
| 7 | 42 | -24 | -21 | -18 | -15 | -12 | -9 | -6 | -3 | — |

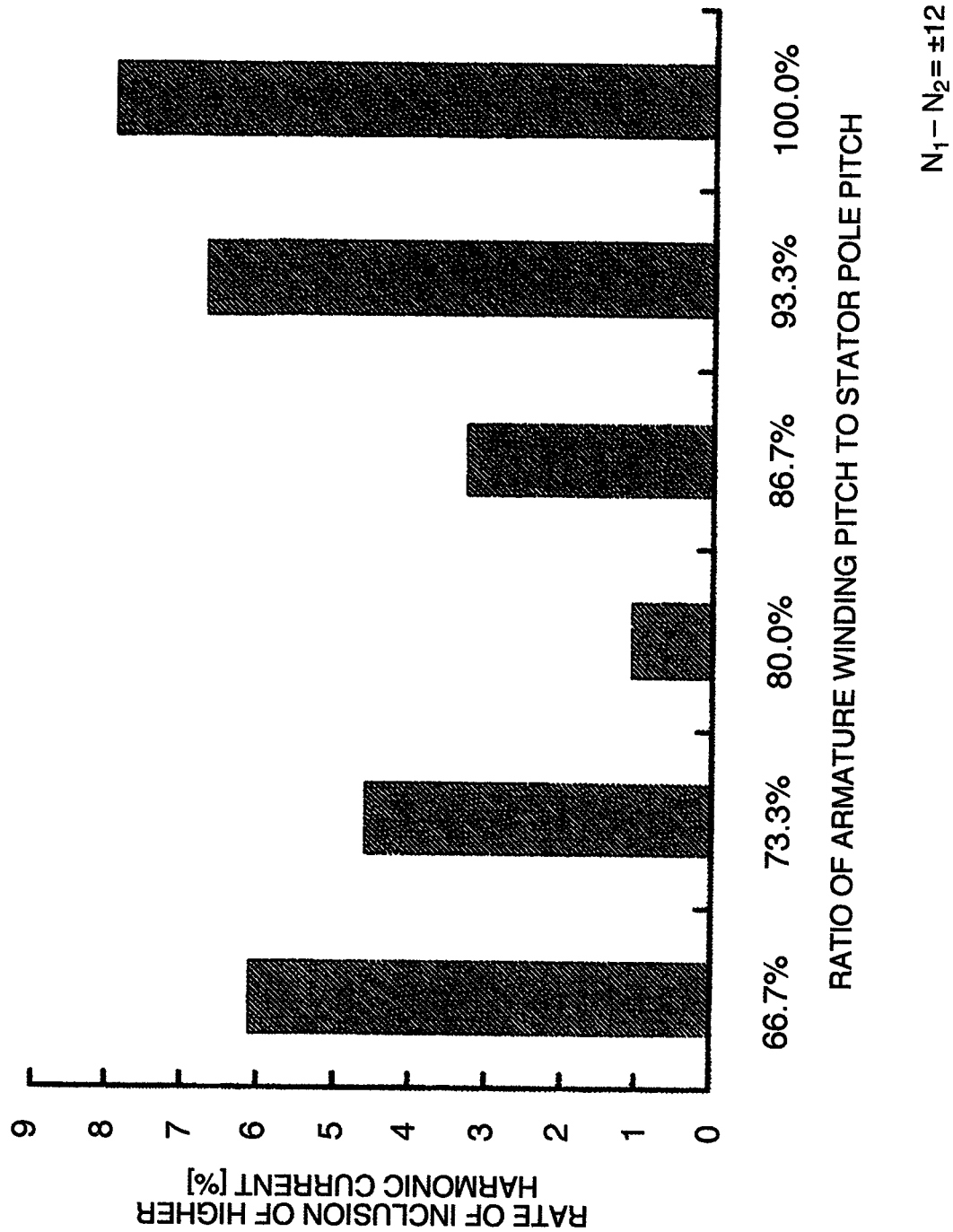

FIG. 6

SYNCHRONOUS GENERATOR AND SYNCHRONOUS GENERATOR SYSTEM FOR REDUCING DISTORTION OF CURRENT WAVEFORM

BACKGROUND OF THE INVENTION

The present invention relates to a synchronous generator and a synchronous generator system driven by a windmill.

In order to use an AC-excited synchronous generator in a wind power generation system, it is essential to reduce the weight of the AC-excited synchronous generator as compared with the conventional counterparts. The requirement for weight reduction comes from the following reason. When a wind power generation system is constructed, the generator must be lifted up to the nacelle by a crane. In a wind power generation system using a large-sized windmill, the nacelle is located at more than 100 m above the ground level. Since the strength and therefore the diameter of the pillar for supporting the windmill is determined by the weight of the generator, the reduction of the weight of the generator is taken into much more consideration for the wind power generation system than for other types of power generation systems.

One way of reducing the weight of an AC-excited synchronous generator is to reduce the length of the air gap between the stator and the rotor. Reducing the air-gap length leads to reducing the magnetic resistance in the air gap so that the exciting current flowing through the field winding can be decreased. Accordingly, the cross section area of the conductor of the field winding can be diminished so that the resultant generator can be decreased in size and weight.

However, if the air-gap length is reduced, the spatial change in the magnetic resistance in the air gap becomes large due to the existence of slots in the stator and rotor so that the distortion of the armature current waveform is enhanced.

JP-A-3-270664 discloses a technique which is designed to improve the armature current waveform, wherein the numbers of the slots in the stator and rotor and the winding pitches for the stator and rotor are optimized to improve the waveform.

JP-A-7-15901 discloses a technique designed for improving the armature current waveform, wherein the winding pitches are so chosen that the winding factors relating to the slot-associated higher harmonics can be minimized.

JP-A-2005-304271 discloses a technique for suppressing the distortion of the armature current waveform by equating to ±6 the number of slots per two poles in stator minus the number of slots per two poles in rotor.

SUMMARY OF THE INVENTION

According to the technique disclosed in JP-A-3-270664, the stator winding is in the form of a fractional-slot winding so as to smooth the waveform of the output voltages. However, the effect of reducing the distortion of the armature current waveform is sometimes small in a rotary electric machine with fractional-slot stator winding.

The AC-excited synchronous generator generally has the same structure as conventional wound-rotor type induction machines. And the techniques disclosed in JP-A-7-15901 and JP-A-2005-304271 both employ the values recommended in the design of conventional induction machines which are disclosed in the article "Transformers, Induction machines and AC commutator machines", Communicational Education Group of IEEJ, p. 112, 1967. Accordingly, the value indicating the number of slots per two poles in the stator minus the number of slots per two poles in the rotor is set between +6 and −6. On the other hand, the inventors of the present invention have revealed the fact that the influence by the higher harmonics in the armature current waveform seems to decrease as the absolute quantity of this value becomes larger. It, therefore, seems to be considered that the influence by the higher harmonics in the armature current waveform cannot be sufficiently suppressed, that is, the armature current waveform cannot be sufficiently smoothed, if this value is maintained between +6 and −6.

The object of the present invention is to provide an AC-excited synchronous generator which can reduce the distortion of the armature current waveform and such an AC-excited synchronous generator for use in a wind power generation system.

According to the present invention, there is provided a synchronous generator comprising a rotor in the plural slots of which the field winding is embedded, and a stator in the plural slots of which the armature winding is embedded, wherein the number of slots per two poles in the stator minus the number of slots per two poles in rotor is equal to or greater than +9, or equal to or smaller than −9.

Other objects, features and advantages of the invention will become apparent from the following description of the embodiments of the invention taken in conjunction with the accompanying drawings.

BRIEF DESCRIPTION OF THE DRAWINGS

FIG. 2 is a table listing various values of the number of slots per two poles in the stator minus the number of slots per two poles in the rotor, calculated when the number $N_{pp}$ of slots per pole per phase in either of the stator and the rotor falls within a range of 3~7;

FIG. 5 graphically shows the relationship between the ratio of the armature winding pitch to the stator pole pitch in an AC-excited synchronous generator with the value of $N_1-N_2$ equal to ±12, and the factor of inclusion of higher harmonic currents, the relationship having been observed as the result of actual measurement;

FIG. 6 shows a table listing the values for the armature winding pitch and the corresponding values for the ratio of the armature winding pitch to the stator pole pitch in the AC-excited synchronous generator wherein the number $N_{spp}$ of slots per pole per phase in the stator is such that $3 \leq N_{spp} \leq 7$, the number of poles is equal to or less than 12, and the number of slots in the stator is equal to or less than 144;

DESCRIPTION OF THE EMBODIMENTS

Embodiments of the present invention will be described below in reference to the attached drawings.

First Embodiment

The first embodiment of the present invention will be described below. In the first embodiment of the present invention, the armature current waveform is smoothed by controlling the value indicating the number of slots per two poles in the stator minus the number of slots per two poles in the rotor.

Figure 1:
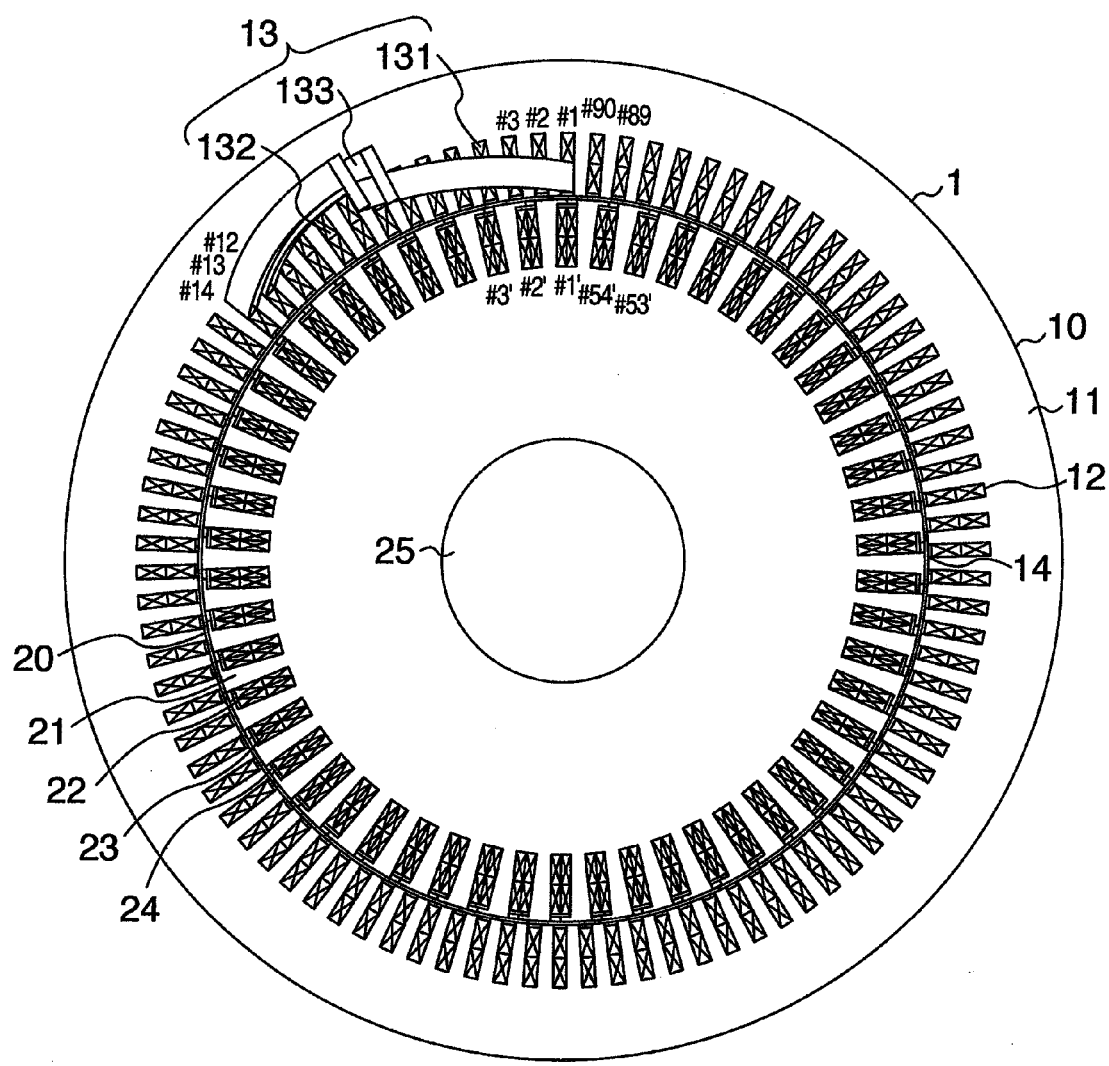
FIG. 1 shows in cross section the principal parts of an AC-excited synchronous generator according to the present invention.

FIG. 1 shows in cross section the principal parts of an AC-excited synchronous generator according to the present invention. In FIG. 1, an AC-excited synchronous generator 1 comprises a stator 10, a rotor 20, an armature winding 13 and a rotary shaft 25.

The armature winding 13 comprises bottom coil sides 131, top coil sides 132 and coil ends 133. The coil ends 133 electrically connect the bottom coil sides 131 and the top coil sides 132.

The stator 10 has the bottom coil sides 131 and the top coil sides 132 inserted in the stator slots 12 cut in a stator iron core 11 and immobilized by means of stator wedges 14. In the example shown in FIG. 1, both the bottom coil sides 131 and the top coil sides 132 of the armature winding 13 are seen labeled from #1 through #90 in the counterclockwise direction.

The rotor 20 has a field winding 23 inserted in rotor slots 22 cut in an armature iron core 21 and immobilized by means of rotor wedges 24. The rotary shaft 25 is fitted in the rotor iron core 21. As shown in FIG. 1, the coil ends of the field winding 23 are seen labeled from #1' through #54' in the counterclockwise direction.

With the AC-excited synchronous generator 1, power generation is performed, that is, armature current is caused to flow through the armature winding 13, by rotating the shaft 25 by rotational force imparted thereto while exciting current is flowing through the field winding 23. The frequency of the generated armature current varies depending on the rotational speed of the rotor 20 and also on the frequency of the exciting current flowing through the field winding 23. Even in the case where a windmill drives the rotor shaft 25 as in a wind power generation system and therefore the rotational speed of the rotor 20 continually changes, the frequency of the generated current can be maintained at a fixed value by controlling the frequency of the exciting current flowing through the field winding 23.

[Three-Phase Rotary Electric Machine]

Now, description is made of how a three-phase rotary electric machine is designed. The article extracted from "Electric Machinery (I)" of Applied Electrical Engineering Treatise, by Sakutaro Nonaka, published by Morikita Publishing Co. Ltd., p. 227 (1973), recommends, in the design of a three-phase rotary electric machine, that the number $N_{pp}$ of slots per pole per phase in either of the stator or the rotor should be set within a range given by the following inequality (1).

$$3 \leq N_{pp} \leq 7 \tag{1}$$

FIG. 2 is a table listing various values indicating the number $N_1$ of slots per two poles in the stator minus the number $N_2$ of slots per two poles in the rotor (hereafter referred to as "value of $N_1-N_2$") calculated when the number $N_{pp}$ of slots per pole per phase in either of the stator and the rotor lies within a range given by the above equality (1). It is understood from FIG. 2 that the maximum and minimum values of $N_1-N_2$ calculated when $N_{pp}$ falls within the range given by the inequality (1), are +24 and −24, respectively.

[Value of $N_1-N_2$]

Concrete description will now be made of the value of $N_1-N_2$.

It is recommended in the design of an induction machine to set the total number $n_1$ of slots in the stator and the total number $n_2$ of slots in the rotor within a range given by the following inequality (2) which is described in "Transformers, Induction machines and AC commutator machines", Communicational Education Group of IEEJ, p. 112, 1967.

$$0.80 n_1 \leq n_2 \leq 1.25 n_1 \tag{2}$$

The value of $N_1-N_2$ ranges between +6 and −6 when calculated under the condition given by the above inequality (2). In general, since AC-excited synchronous generators are almost the same in structure as wound-rotor type induction machines, they have been designed employing the above recommended value of $N_1-N_2$.

Namely, in the design of AC-excited synchronous generators, the value of $N_1-N_2$ has been generally set between +6 and −6 in accordance with the condition given by the above inequality (2).

[Derivation of Expression for Giving Current Flowing Through Armature Winding]

The expression for giving the armature current I flowing through the armature winding 13 will now be derived. Here, the expression for giving the armature current I is derived in simplified consideration of phase-related effects. First, let the magneto-motive force (mmf) AT associated with the frequency components of the armature current I flowing through the armature winding be represented by the following expression (3).

$$AT \propto \sum_k f_{wk}/k \cos(kx \mp \omega_o t) \tag{3}$$

where x is fixed to the stator coordinate system and takes a value of $2\pi$ per two poles; $\omega_o$ is the angular frequency corresponding to synchronous speed; t is the time; k is the order of mmf; and $f_{wk}$ is the stator windings factor for the k-th harmonic wave.

The stator windings factor $f_{wk}$ is given by the following expressions (4), (5) and (6).

$$f_{wk} = f_{pk} \times f_{dk} \tag{4}$$

$$f_{pk} = \sin(pk\pi/2) \tag{5}$$

$$f_{dk} = \sin(k\pi/2q)/(n \times \sin(k\pi/2N_{spp}q)) \tag{6}$$

where $f_{pk}$ is the short-pitch winding factor for the stator; $f_{dk}$ is the distributed winding factor for the stator; p is the ratio of the armature winding pitch to the stator pole pitch; q is the number of phases in the stator; and $N_{spp}$ is the number of slots per pole per phase in the stator.

Let the spatial distribution P of permeance, which is the reciprocal of magnetic resistance, be represented by the following expression (7), with the spatial change in the magnetic resistance due to the slots in the rotor and stator taken into consideration.

$$P \propto (1+K_1 \cos N_1 x) \times (1+K_2 \cos N_2(x-(1-s)\omega_o t)) \quad (7)$$

where $K_1$ is the factor of pulsation of permeance due to stator slots, $K_2$ is the factor of pulsation of permeance due to rotor slots, and s is the slip. The magnetic flux density B is proportional to the product of the magneto-motive force AT and the permeance P, and can be represented by the following expression (8).

$$B \propto AT \times P \quad (8)$$

The magnetic flux density B is then spatially integrated, and if the short-pitch winding factor of the stator is taken into consideration, the magnetic flux $\Phi$ linking the armature winding 13 is assumed to be given by the following expression (9).

$$\Phi \propto B \times f_{pkB}/k_B \quad (9)$$

where $k_B$ is the order of the spatial higher harmonic of the magnetic flux density B, and $f_{pkB}$ is the stator short-pitch winding factor for the $k_B$-th harmonic of the magnetic flux density B.

The magnetic flux $\Phi$ is then temporally integrated, and the electro-motive force E induced in the armature winding 13 is assumed to be represented by the following expression (10).

$$E \propto (B \times f_{pkB}/k_B) \times v_B \quad (10)$$

where $v_B$ is the order of the time-dependent higher harmonic of the magnetic flux density B.

If the armature current I is assumed to be equal to (induced electro-motive force E)/(reactance) and if the reactance is assumed to be proportional to the order $v_B$ of the time-dependent higher harmonic of the magnetic flux density B, then the armature current I can be assumed to be given by the following expression (11).

$$I \propto ((B \times f_{pkB}/k_B) \times v_B)/v_B = AT \times P \times f_{pkB}/k_B \quad (11)$$

Figure 3:
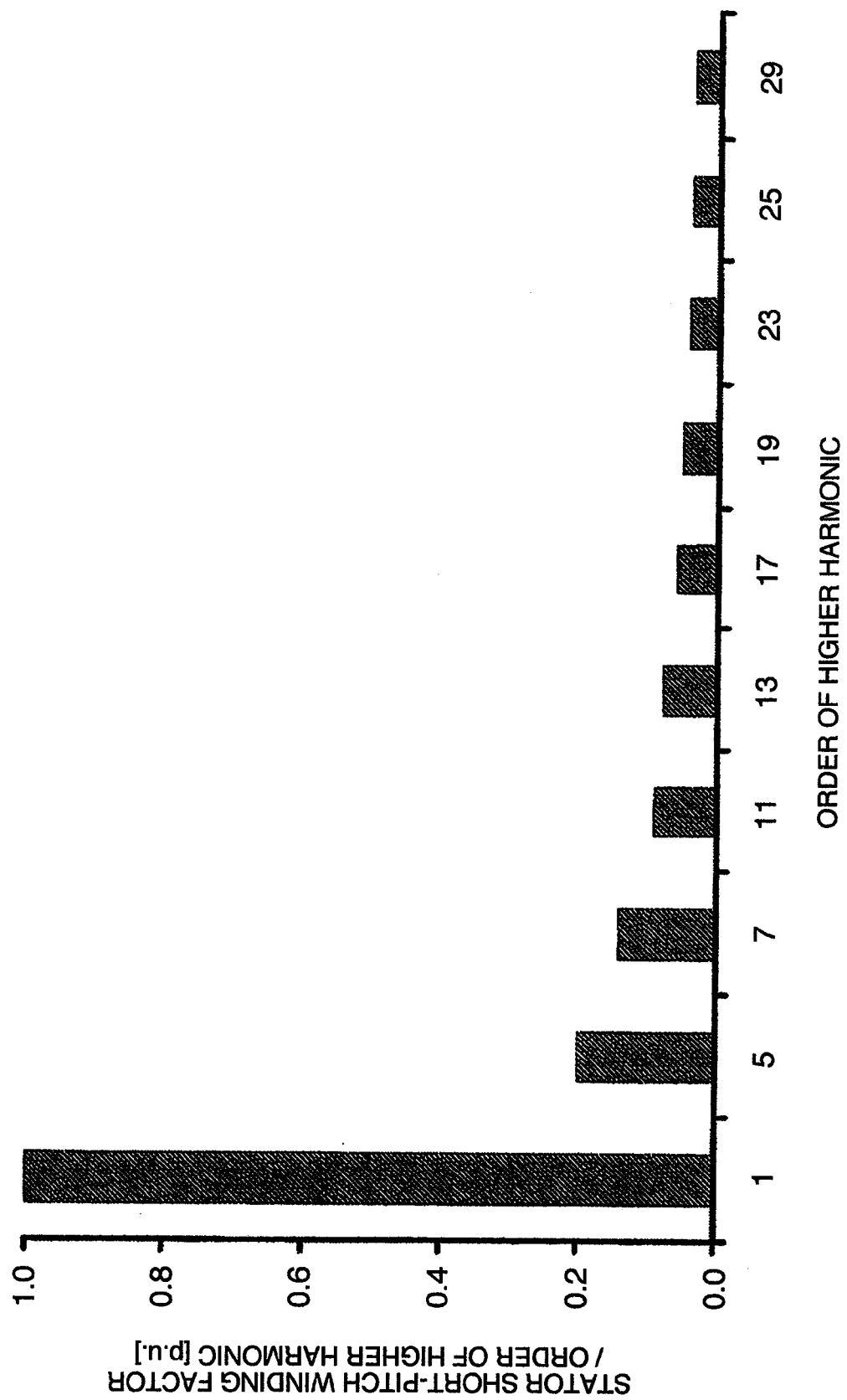
FIG. 3 shows the relationship between the quotient (stator short-pitch winding factor $f_{pkB}$)/(order $k_B$ of higher harmonic), and the order $k_B$ of higher harmonic.

FIG. 3 shows the relationship between the quotient, i.e., (stator short-pitch winding factor $f_{pkB}$)/(order $k_B$ of higher harmonic), and the order $k_B$ of higher harmonic. Since the armature current I is proportional to the quotient, as is seen from the expression (11), then it is considered from FIG. 3 that the armature current I increases as the value of the quotient increases.

The relationship shown in FIG. 3 reveals that the armature current I generated when the order kB of higher harmonic is equal to unity, becomes so large that the armature current I generated when the order $k_B$ is other than unity is negligible. Therefore, only that higher harmonic component of the armature current which corresponds to $k_B=1$, will be hereafter considered.

The inventors of the present invention have derived the expressions given below, paying attention to higher harmonic components related to the value of $N_1-N_2$.

If the expressions (3) and (7) given above are substituted into the last given expression (11) and if only the higher harmonic component with respect to the value of $N_1-N_2$ is considered, then, in the case where $N_1 > N_2$, the expression (11) can be modified into the expression (12) as follows.

$$I \propto (f_{w(|N_1-N_2|-1)} K_1 K_2 f_{p1}/(|N_1-N_2|-1)/4) \times \quad (12)$$
$$\cos(x-(1+N_2(1-s))\omega_o t) +$$
$$(f_{w(|N_1-N_2|+1)} K_1 K_2 f_{p1}/(|N_1-N_2|+1)/4) \times$$
$$\cos(x-(1+N_2(1-s))\omega_o t)$$

On the other hand, for N1<N2, the expression (11) can be modified into the expression (13) as follows.

$$I \propto (f_{w(|N_1-N_2|-1)} K_1 K_2 f_{p1}/(|N_1-N_2|-1)/4) \times \quad (13)$$
$$\cos(x-(1-N_2(1-s))\omega_o t) +$$
$$(f_{w(|N_1-N_2|+1)} K_1 K_2 f_{p1}/(|N_1-N_2|+1)/4) \times$$
$$\cos(x-(1-N_2(1-s))\omega_o t)$$

From the expressions (12) and (13), it is understood that the pulsation of the output current results from the higher harmonic components attributable to the value of $N_1-N_2$.

Figures 4A, 4B:
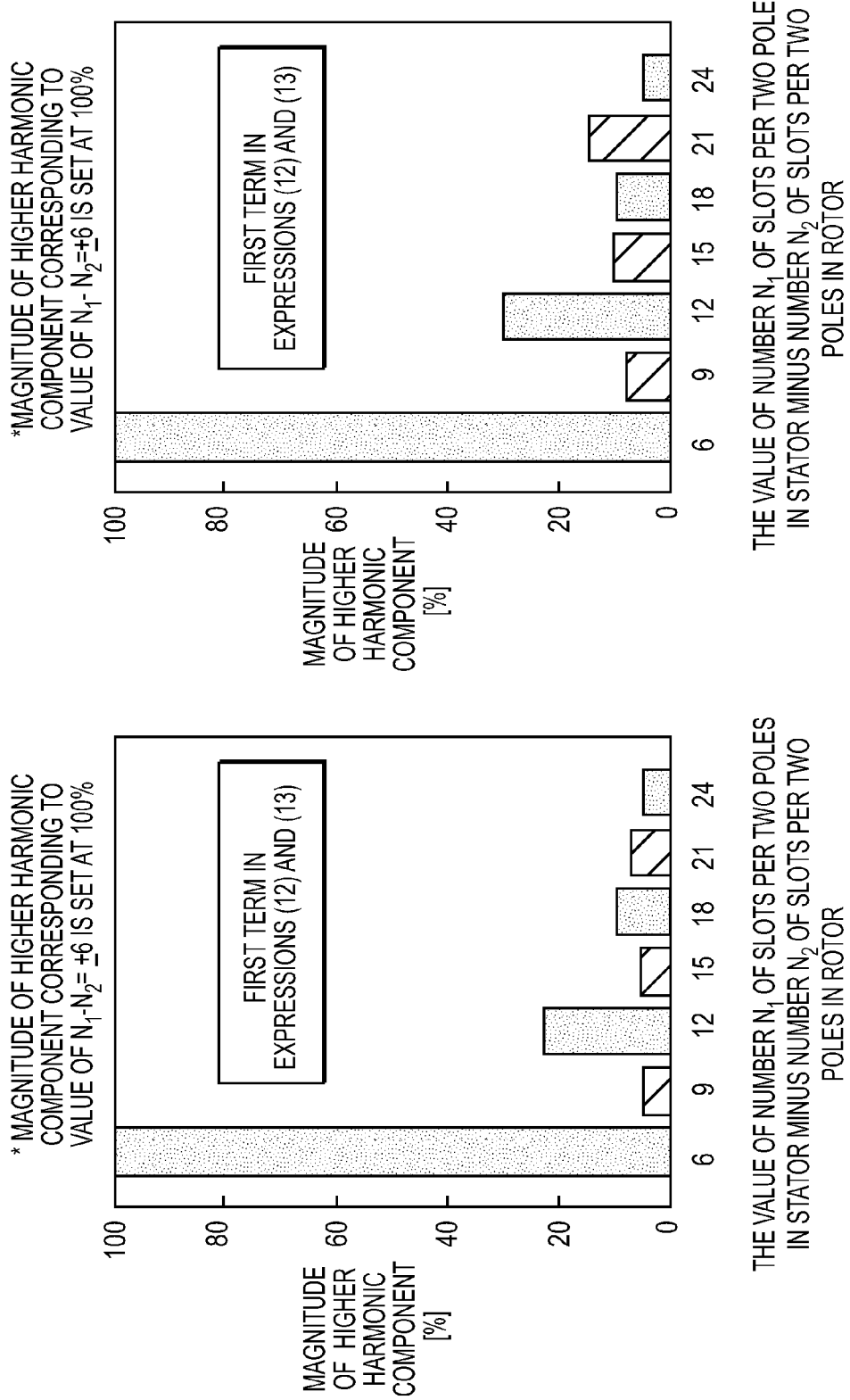
FIGS. 4A and 4B show the relationship between the value of the number $N_1$ of slots per two poles in the stator minus the number $N_2$ of slots per two poles in the rotor, and the magnitudes of the higher harmonic components.

FIG. 4A shows the relationship between the values of $N_1-N_2$ and the magnitudes of the higher harmonic components resulting from the first terms of the expressions (12) and (13), and FIG. 4B shows the relationship between the values of $N_1-N_2$ and the magnitudes of the higher harmonic components resulting from the second terms of the expressions (12) and (13). In FIGS. 4A and 4B, the abscissa indicates the absolute value of $N_{1-2}$, i.e., $|N_1-N_2|$, and the ordinate denotes the magnitudes of the higher harmonic components. It is to be noted that the ordinate, i.e., the magnitudes of the higher harmonic components, is graduated in relative quantity with the magnitude assumed to be 100% when the value of $N_1-N_2$ equals ±6.

As seen from FIG. 4A, the higher harmonic components resulting from the first terms of the expressions (12) and (13) observed when the value of $N_1-N_2$ is greater than +6 or smaller than −6, becomes less than 30% of those observed when the value of $N_1-N_2$ is ±6. In addition, as seen also from FIG. 4B, the higher harmonic components resulting from the second terms of the expressions (12) and (13) observed when the value of $N_1-N_2$ is greater than +6 or smaller than −6, becomes less than 30% of those observed when the value of $N_1-N_2$ is equal to ±6.

Accordingly, in order to suppress the distortion of the armature current waveform, it is required to choose the number of slots in such a manner that the value of $N_1-N_2$ is greater than +6 or smaller than −6, as is outside the range recommended with the above inequality (2).

Further, it is understood from FIG. 2 that the selectable ranges of the value of $N_1-N_2$ under the condition given by the above inequality (1) are between +9 and +24 and between −9 and −24.

[Combinations of Number of Slots Per Pole Per Phase in Stator and Number of Slots Per Pole Per Phase in Rotor]

Consideration will now be given, in this embodiment, to the values of $N_1-N_2$ for the following four different combinations of the number of slots per pole per phase in the stator and the number of slots per pole per phase in the rotor.

COMBINATION 1: Case where the number of slots per pole per phase in the stator is an integer and the number of slots per pole per phase in the rotor is also an integer.

COMBINATION 2: Case where the number of slots per pole per phase in the stator is a fraction and the number of slots per pole per phase in the rotor is an integer.

COMBINATION 3: Case where the number of slots per pole per phase in the stator is an integer and the number of slots per pole per phase in the rotor is a fraction.

COMBINATION 4: Case where the number of slots per pole per phase in the stator is a fraction and the number of slots per pole per phase in the rotor is also a fraction.

[Combination 1]

In this combination, the number of slots per pole per phase in the stator is an integer and the number of slots per pole per phase in the rotor is also an integer.

In this case, it is seen from FIG. 2 that the value of $N_1-N_2$ is equal to ±12, ±18, or ±24.

As is apparent from FIGS. 4 (4A and 4B), the higher harmonic current generated when the value of $N_1-N_2$ is equal to ±12, ±18, or ±24, is smaller by more than 30% than that generated when the value of $N_1-N_2$ is equal to ±6. This means that if the number of slots per pole per phase in the stator is an integer and the number of slots per pole per phase in the rotor is also an integer, the higher harmonic components of the armature current are reduced in magnitude. Accordingly, in such a case, the armature current waveform can be smoothed.

Further, if the number $N_{pp}$ of slots per pole per phase in a three-phase rotary electric machine is an integer, the three-phase windings of the rotary electric machine are of integral-slot winding. Since coil winding work becomes simplest in the case where the number $N_{pp}$ of slots per pole per phase is an integer in either of the stator and the rotor, that is, in this case of COMBINATION 1, cost reduction can be expected in this case.

Embodiment 1-1

Concrete Example with Stator and Rotor Slot Numbers Selected in Accordance with COMBINATION 1

COMBINATION 1 is the case where the number of slots per pole per phase in the stator is an integer and the number of slots per pole per phase in the rotor is also an integer. To be more concrete, in the AC-excited synchronous generator shown in FIG. 1, the number of slots in the stator is 90, the number of slots in the rotor is 54, the number of poles is 6, and the number of phases is 3. In this case, the number of slots per pole per phase in the stator is 5 and the number of slots per pole per phase in the rotor is 3. Also, the number $N_1$ of slots per two poles in the stator is 30, the number $N_2$ of slots per two poles in the rotor is 18, and the value of $N_1-N_2$ is 12. Accordingly, as seen from FIG. 4, the higher harmonic components of the armature current are reduced in magnitude so that the armature current waveform can be smoothed.

[Combination 2]

In this combination, the number of slots per pole per phase in the stator is a fraction and the number of slots per pole per phase in the rotor is an integer.

In this case, it is seen from FIG. 2 that the value of $N_1-N_2$ is equal to ±9, ±15, or ±21.

As is apparent from FIG. 4, the higher harmonic current generated when the value of $N_1-N_2$ is equal to ±9, ±15, or ±21, is smaller by more than 30% than that generated when the value of $N_1-N_2$ is equal to ±6. This means that even if the number of slots per pole per phase in the stator is a fraction and the number of slots per pole per phase in the rotor is an integer, the higher harmonic components of the armature current are reduced in magnitude. Accordingly, in this case, too, the armature current waveform can be smoothed.

If the number $N_{pp}$ of slots per pole per phase in a three-phase rotary electric machine is not an integer, the three-phase windings of the rotary electric machine are of fractional-slot winding.

[Combination 3]

In this combination, the number of slots per pole per phase in the stator is an integer and the number of slots per pole per phase in the rotor is a fraction.

In this case, it is seen from FIG. 2 that the value of $N_1-N_2$ is equal to ±9, ±15, or ±21.

As is apparent from FIG. 4, the higher harmonic current generated when the value of $N_1-N_2$ is equal to ±9, ±15, or ±21, is smaller by more than 30% than that generated when the value of $N_1-N_2$ is equal to ±6. This means that even if the number of slots per pole per phase in the stator is an integer and the number of slots per pole per phase in the rotor is a fraction, the higher harmonic components of the armature current are reduced in magnitude. Accordingly, in this case, too, the armature current waveform can be smoothed.

Since the number of slots per pole per phase in the stator is an integer when the number of slots per pole per phase in the rotor is a fraction, then the winding factor corresponding to the order of higher harmonic equal to the value of $N_1-N_2$ does not occur, that is, the higher harmonic current component generated due to the value of $N_1-N_2$ is reduced to zero. Accordingly, the armature current waveform can be smoothed to a greater extent.

Embodiment 1-2

Concrete Example No. 1 with Stator and Rotor Slot Numbers Selected in Accordance with COMBINATION 3

COMBINATION 3 is the case where the number of slots per pole per phase in the stator is an integer and the number of slots per pole per phase in the rotor is a fraction. To be more concrete, the number of slots in the stator is 108, the number of slots in the rotor is 81, the number of poles is 6, and the number of phases is 3. In this case, the number of slots per pole per phase in the stator is 6 and the number of slots per pole per phase in the rotor is 4.5. Also, the number $N_1$ of slots per two poles in stator is 36, the number $N_2$ of slots per two poles in rotor is 27, and the value of $N_1-N_2$ is 9. Accordingly, as seen from FIG. 4, the higher harmonic components of the armature current are reduced in magnitude so that the armature current waveform can be smoothed.

Embodiment 1-3

Concrete Example No. 2 with Stator and Rotor Slot Numbers Selected in Accordance with COMBINATION 3

In this EMBODIMENT 1-3, the number of slots in the stator is 72, the number of slots in the rotor is 54, the number of poles is 4, and the number of phases is 3. In this case, the number of slots per pole per phase in the stator is 6 and the number of slots per pole per phase in the rotor is 4.5. Also, the number $N_1$ of slots per two poles in stator is 36, the number $N_2$ of slots per two poles in rotor is 27, and the value of $N_1-N_2$ is 9. Accordingly, as seen from FIG. 4, the higher harmonic components of the armature current are reduced in magnitude so that the armature current waveform can be smoothed.

[Combination 4]

In this combination, the number of slots per pole per phase in the stator is a fraction and the number of slots per pole per phase in the rotor is also a fraction.

In this case, it is seen from FIG. 2 that the value of $N_1-N_2$ is equal to ±12, or ±18.

As is apparent from FIG. 4, the higher harmonic current generated when the value of $N_1-N_2$ is equal to ±12, or ±18, is smaller by more than 30% than that generated when the value of $N_1-N_2$ is equal to ±6. This means that even if the number of slots per pole per phase in the stator is a fraction and the number of slots per pole per phase in the rotor is also a fraction, the higher harmonic components of the armature current are reduced in magnitude. Accordingly, in this case, too, the armature current waveform can be smoothed.

Second Embodiment

The second embodiment of the present invention will be described below. In the second embodiment, the armature current waveform is smoothed to a greater extent by setting within a range described later the ratio of armature winding pitch to stator pole pitch, for the AC-excited synchronous generator (with the value of $N_1-N_2$ greater than +9 or smaller than −9).

FIG. 5 graphically shows the relationship between the ratio of the armature winding pitch to the stator pole pitch in an AC-excited synchronous generator with the value of $N_1-N_2$ equal to ±12, and the rate of inclusion of higher harmonic currents, with the three phases short-circuited in the stator, the relationship having been observed as the result of actual measurement. It is seen from FIG. 5 that the rate of inclusion of higher harmonic currents in the armature current in the AC-excited synchronous generator with the value of $N_1-N_2$ equal to ±12 becomes minimum when the ratio of the armature winding pitch to the stator pole pitch is equal to 80%. It is also seen that when the ratio of the armature winding pitch to the stator pole pitch is equal to 86.7%, the rate becomes smallest except the minimum with the ratio equal to 80%.

Accordingly, if the ratio of the armature winding pitch to the stator pole pitch is equated to 80% in the AC-excited synchronous generator with the value of $N_1-N_2$ equal to ±12, the armature current can be smoothed.

Embodiment 2-1

The AC-excited synchronous generator as the embodiment 2-1 is so constructed as shown in FIG. 1 that the bottom coil side 131 and the top coil side 132 of each coil of the armature winding 13, connected with each other by the armature coil end 133 spans 12 slots in the stator. In this case, 15 slots in the stator correspond with a single pole. Accordingly, the ratio of the armature winding pitch to the stator pole pitch and is 12/15, i.e., 80%.

In the exemplary case of the AC-excited synchronous generator shown in FIG. 1, the value of $N_1-N_2$ is equal to ±12, and since the rate of inclusion of higher harmonic currents in the armature current in the AC-excited synchronous generator with the value of $N_1-N_2$ equal to ±12 becomes minimum when the ratio of the armature winding pitch to the stator pole pitch is equal to 80%, as shown in FIG. 5, then the armature current can be smoothed in this embodiment too.

Figure 6:
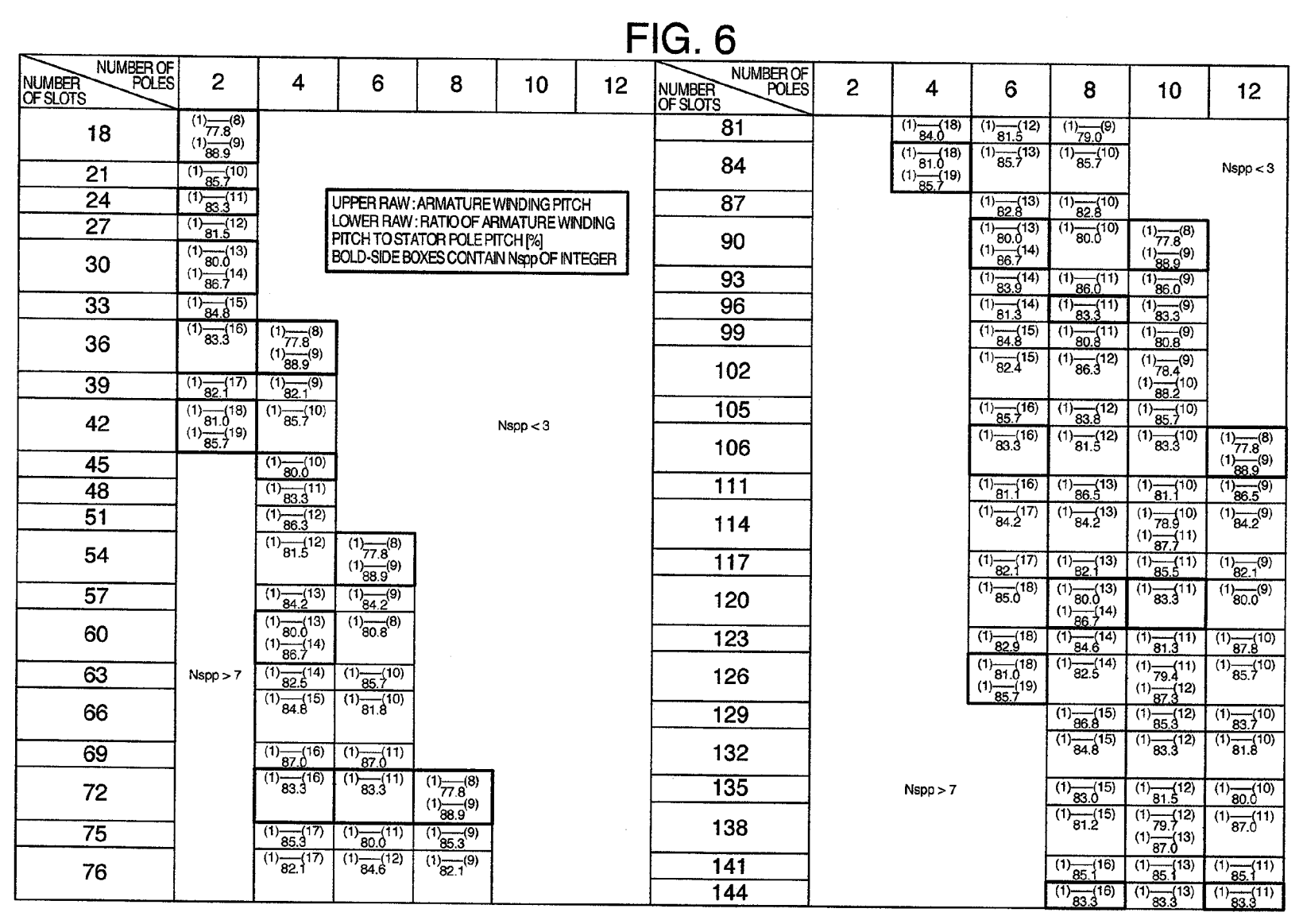

FIG. 6 shows a table listing the values for the armature winding pitch and the corresponding values for the ratio of the armature winding pitch to the stator pole pitch in the AC-excited synchronous generator wherein the number $N_{spp}$ of slots per pole per phase in the stator is such that $3 \le N_{spp} \le 7$, the number of poles is equal to or less than 12, and the number of slots in the stator is equal to or less than 144.

Even in the case where a given AC-excited synchronous generator has a number of slots and a number of poles which are different from those of the AC-excited synchronous generator shown as the embodiment 2-1 in FIG. 1, if the given AC-excited synchronous generator has the values for the armature winding pitch and the corresponding values for the ratio of the armature winding pitch to the stator pole pitch, listed in the table shown in FIG. 6, then the higher harmonic current components can be reduced in magnitude.

Let it be assumed in FIG. 6 that if the #1 top coil side 132 and the #13 bottom coil side 131 of the armature winding are electrically connected with each other via the coil end 133, the armature winding pitch is represented as [(1)-(13)].

If the armature winding pitch is assumed to take values given in the table in FIG. 6, the ratio of the armature winding pitch to the stator pole pitch falls within a range of 77.8%~88.9%.

Although only AC-excited synchronous generators wherein the number $N_{spp}$ of slots per pole per phase in the stator is such that $3 \le N_{spp} \le 7$, the number of poles is equal to or less than 12, and the number of slots in the stator is equal to or less than 144, are shown in FIG. 6, the effect of improving the armature current waveform can be expected even with an AC-excited synchronous generator whose parameters take values different from those listed in the table in FIG. 6 if the ratio of the armature winding pitch to the stator pole pitch is adjusted to be within a range of 77.8%~88.9%.

Alternatively, maintaining the ratio of the field winding pitch to the rotor pole pitch within a range of 77.8%~88.9% can also lead to the reduction in the magnitudes of the higher harmonic current components.

Third Embodiment

The third embodiment will now be described. In this third embodiment, the pulsation factor of magnetic flux can be reduced by reducing the ratio of the width s of slot opening in the rotor to the gap length g in the AC-excited synchronous generator (i.e., AC-excited synchronous generator wherein the value of $N_1-N_2$ is equal to or greater than +9, or equal to or less than −9) according to the first embodiment, and therefore the armature current waveform can be further improved.

Figure 7:
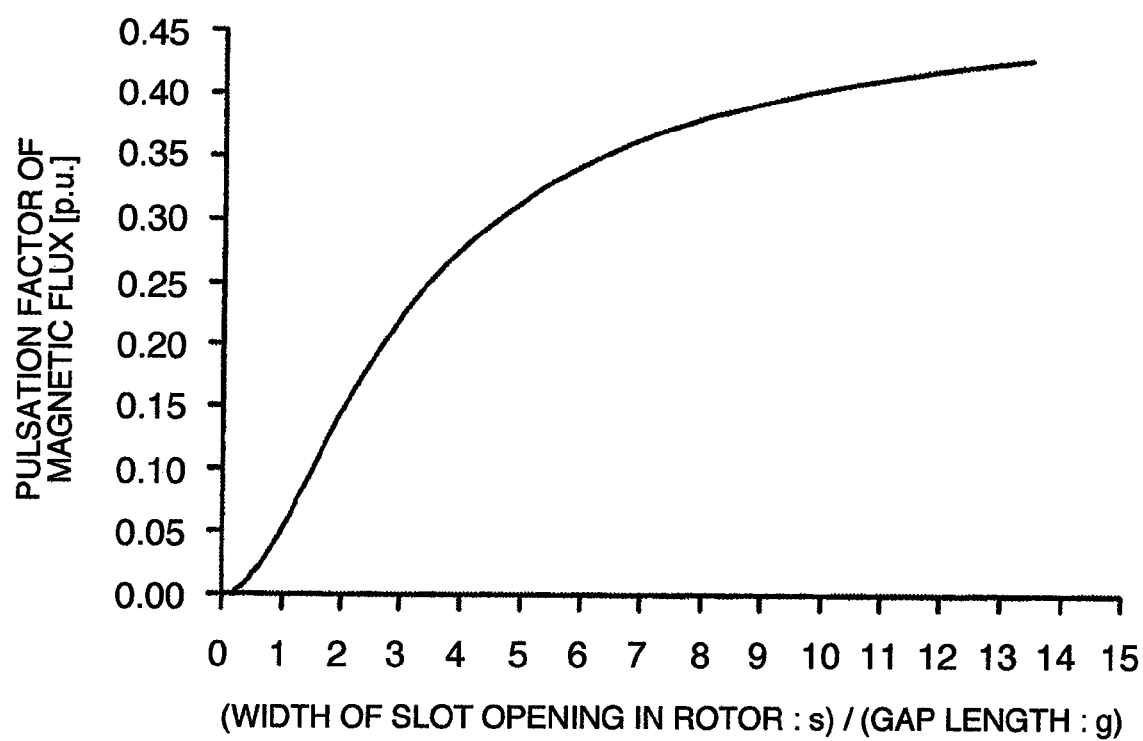
FIG. 7 graphically shows the relationship between the pulsation factor of magnetic flux and the ratio of width s of slot opening in the rotor to gap length g.

FIG. 7 graphically shows the relationship between the pulsation factor of magnetic flux and the ratio of the width s of slot opening in the rotor to the gap length g. It is seen from FIG. 7 that if the ratio of the rotor slot opening width s to the gap length g decreases, the magnetic flux pulsation factor decreases. Since the magnetic flux pulsation factor is proportional to $K_2$ in the expressions (12) and (13) given above, it is understood that the reduction in the ratio of slot opening width s to gap length g leads to the reduction in the magnetic flux pulsation factor and therefore that the armature current waveform can be improved.

Figure 9:
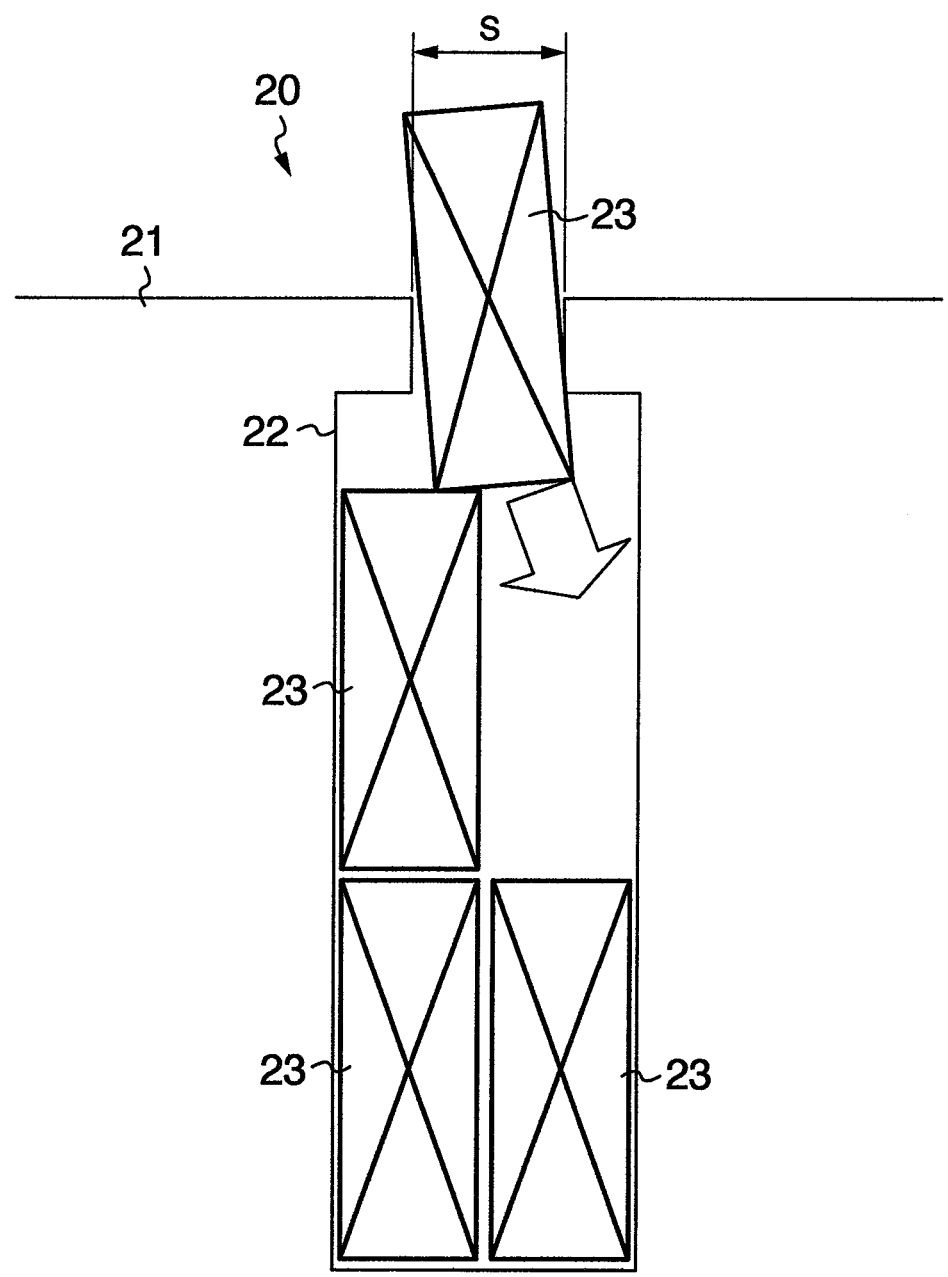
FIG. 9 shows the shape of a circumferentially symmetric semi-closed rotor slot.

However, as shown in FIG. 9, if the rotor slot 22 is in the shape of a circumferentially symmetric semi-closed slot with a reduced slot opening width s, it is hard to insert the conductor of the field winding 23 into the slot 22 in the coil winding process, due to the narrowed slot opening.

Figure 10:
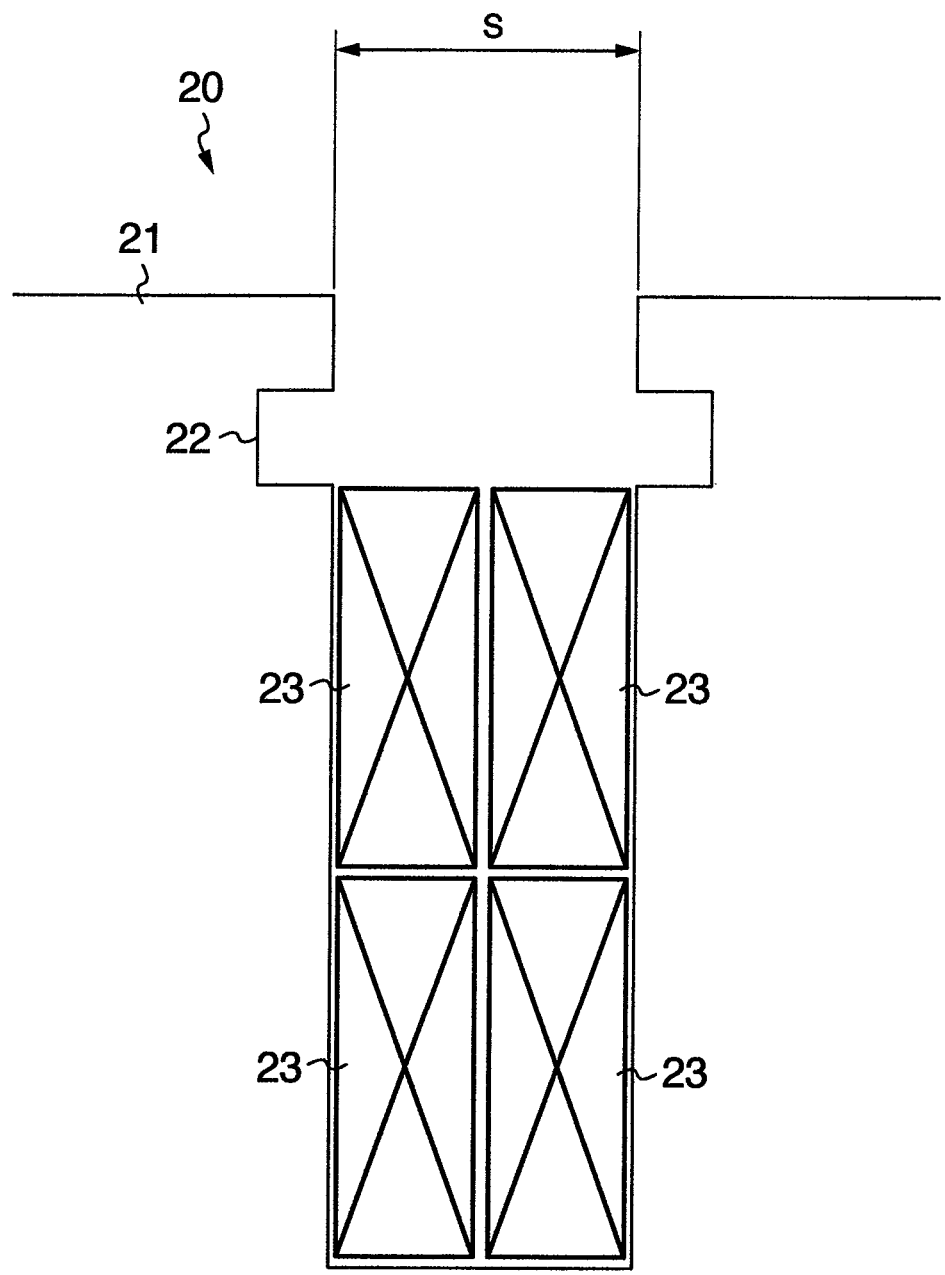
FIG. 10 shows the shape of a circumferentially symmetric open rotor slot.

On the other hand, if the slot is in the shape of a conventional open slot, as shown in FIG. 10, in which the gap length s is reduced to reduce the dimensions of the AC-excited synchronous generator, the ratio of rotor slot opening width s to gap length g is about 6.8 and the magnetic flux pulsation factor is about 0.36 as seen from FIG. 7.

Embodiment 3-1

Figure 8:
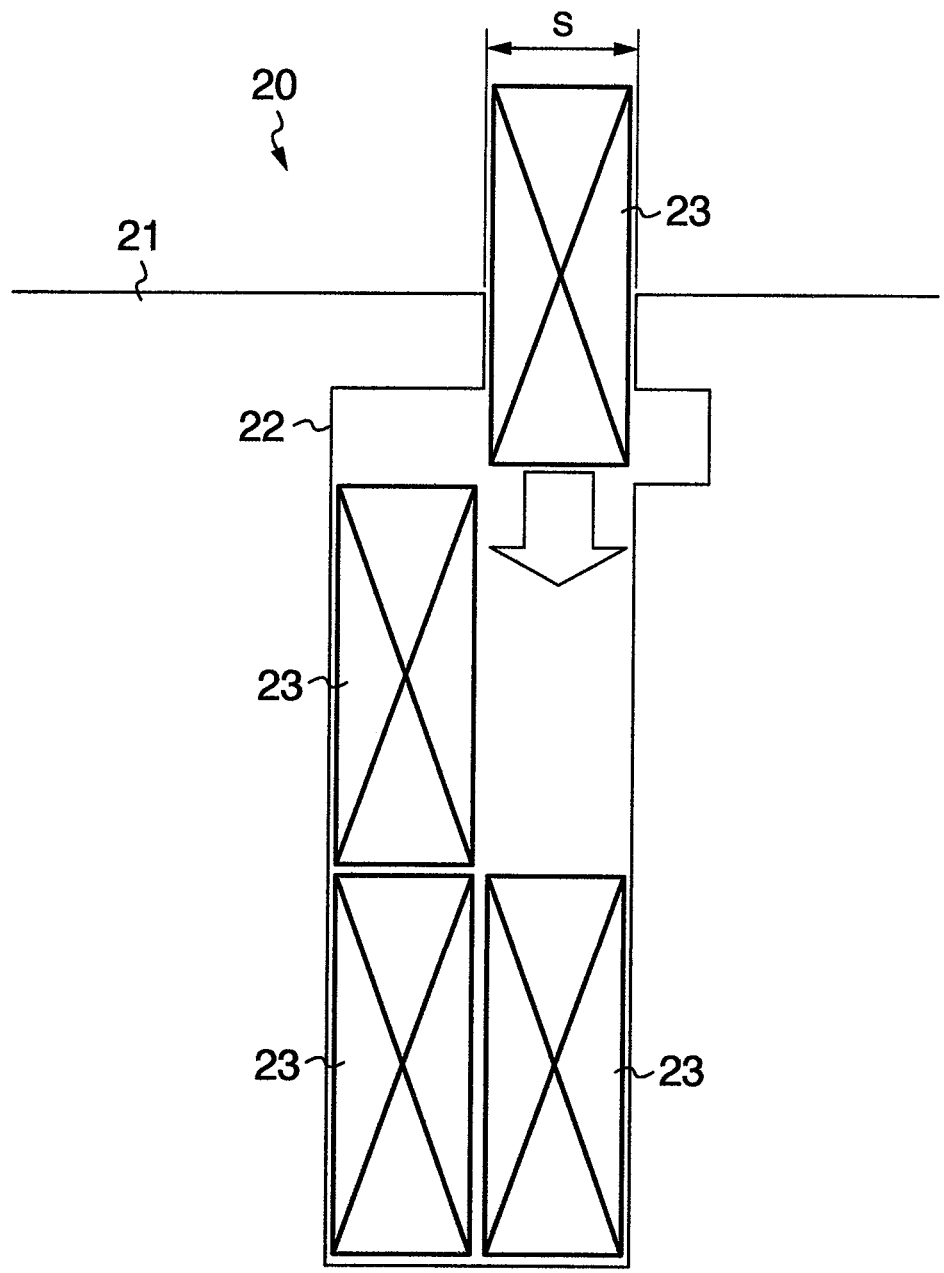
FIG. 8 shows the shape of the rotor slot in an AC-excited synchronous generator as an embodiment of this embodiment.

In this embodiment 3-1, the shape of the rotor slot in an AC-excited synchronous generator is made circumferentially asymmetric as shown in FIG. 8. In this case, even if the slot opening width s is small, the gap through which the field winding 23 is wound is sufficiently wide.

The AC-excited synchronous generator of the embodiment 3-1 employs the semi-closed slot shape as shown in FIG. 8. Accordingly, the ratio of rotor slot opening width s to gap of length g is about 3.4 which is about half the corresponding ratio for the open slot. The resultant magnetic flux pulsation factor is about 0.25 as shown in FIG. 7.

Thus, by employing the rotor slot in the shape of a circumferentially asymmetric semi-closed slot as in the embodiment 3-1, the higher harmonic components of the armature current can be reduced by about 30% as compared with the conventional open slot as shown in FIG. 10.

In this third embodiment, it is also possible to decrease the magnetic flux pulsation factor and therefore to improve the armature current waveform, by reducing the ratio of rotor slot opening width s to gap length g in the AC-excited synchronous generator in the second embodiment.

Fourth Embodiment

The fourth embodiment will now be described. In this fourth embodiment, the armature current waveform can be further improved by providing magnetic wedges 15 in the openings of the stator slot 12 and the rotor slot 22 in the AC-excited synchronous generator (i.e., AC-excited synchronous generator wherein the value of $N_1-N_2$ is equal to or greater than +9, or equal to or less than −9) according to the first embodiment.

Figure 11:
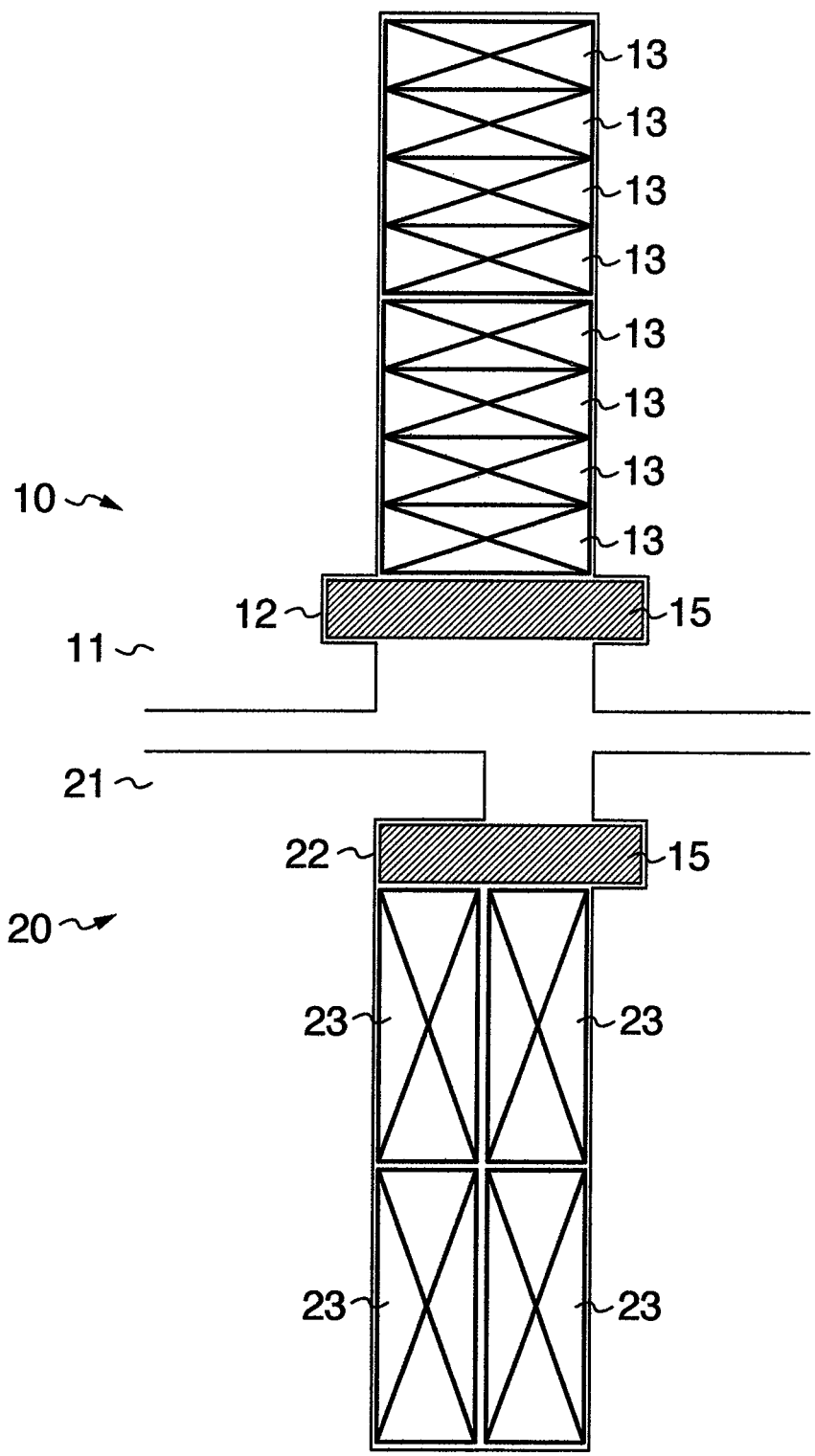
FIG. 11 shows the shapes of the stator slot and the rotor slots with magnetic wedges provided in their openings, according to an embodiment of the present invention.

In this fourth embodiment, as shown in FIG. 11, the magnetic wedges 15 are provided in the openings of the stator slot 12 and the rotor slots 22. The provision of the magnetic wedges 15 in the openings of the stator slots 12 and the rotor slots 22 allows magnetic flux to be induced in the openings of the stator slots 12 and the rotor slots 22, so that the magnetic flux pulsation can be suppressed to thereby improve the armature current waveform. Also, since this configuration can reduce the associated copper loss, iron loss and loss due to stray load, the factor of improving the armature current waveform can be increased. Further, since the magnetic flux pulsation can be suppressed, vibrations and acoustic noise can be suppressed.

In this fourth embodiment, it is also possible to improve the armature current waveform by providing magnetic wedges 15 in the openings of the stator slots 12 and the rotor slots 22 in the AC-excited synchronous generator according to the second or third embodiment.

Fifth Embodiment

Figure 12:
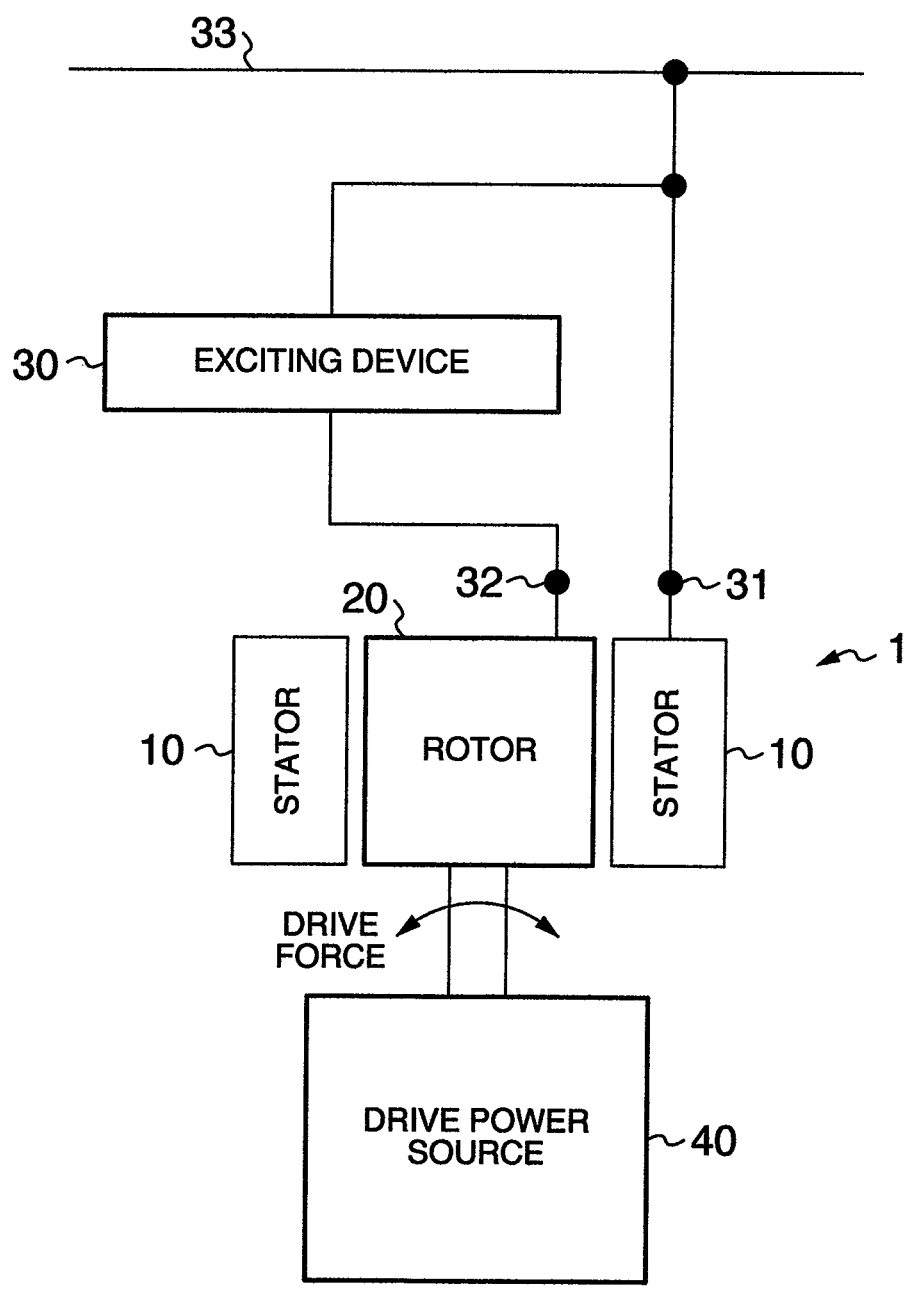
FIG. 12 schematically shows the entire structure of an AC-excited synchronous generator system according to the fifth embodiment.

The fifth embodiment will now be described. FIG. 12 schematically shows the entire structure of an AC-excited synchronous generator system according to this embodiment. The AC-excited synchronous generator system according to this fifth embodiment comprises an AC-excited synchronous generator 1, a variable-frequency AC exciting device 30 and a drive power source 40.

The AC-excited synchronous generator 1 used in this fifth embodiment is similar in structure to the AC-excited synchronous generators described in the above first to fourth embodiments, and has an armature winding terminal 31 and a field winding terminal 32. The field winding terminal 32 of the AC-excited synchronous generator 1 is connected with the output terminal of the variable-frequency AC exciting device 30. The armature winding terminal 31 of the AC-excited synchronous generator 1 and the input terminal of the variable-frequency AC exciting device 30 are both connected with a power system 33.

The rotor 20 of the AC-excited synchronous generator 1 is rotated by the drive force supplied from the drive power source 40. The variable-frequency AC exciting device 30 supplies an exciting current to the AC-excited synchronous generator via the field winding terminal 32. As a result, electric power can be supplied to the power system 33 via the armature winding terminal 31.

Since the power required to cause exciting current to flow into the AC-excited synchronous generator 1 via the field winding terminal 32 is only 20 or 30% of the power outputted from the armature winding terminal 31 of the AC-excited synchronous generator 1, the capacity of the variable-frequency AC exciting device 30 can be made smaller, and therefore cost reduction can be further expected, by connecting the output terminal of the variable-frequency AC exciting device 30 with the field winding terminal 32, as described in this fifth embodiment, than by connecting the output terminal of the variable-frequency AC exciting device 30 with the armature winding terminal 31.

Moreover, since the AC-excited synchronous generator 1 used in this fifth embodiment is similar in structure to the AC-excited synchronous generators described in the above first to fourth embodiments, the distortion of the waveform of the current delivered out of the armature winding terminal 31 is suppressed. Therefore, in this embodiment, there is no need for providing a converter between the armature winding terminal 31 of the AC-excited synchronous generator 1 and the power system 33.

In the case where there is no converter between the armature winding terminal 31 of the AC-excited synchronous generator 1 and the power system 33, current flows from the armature winding terminal 31 directly into the power system 33. It is therefore required to previously shape the waveform of the current delivered from the armature winding terminal 31 so that the power system 33 may not be adversely affected. However, according to this mode of practice, the distortion of the waveform of the current delivered from the armature winding terminal 31 of the AC-excited synchronous generator 1 is suppressed to such a great extent that the waveform no more imposes any adverse effect on the power system 33.

Accordingly, in this aspect, too, it is especially advantageous to use the AC-excited synchronous generator as described in the first to fourth embodiments, in the AC-excited synchronous generator system according to this fifth embodiment, wherein the armature winding terminal 31 is connected directly with the power system 33 to directly supply power to the power system 33.

One example of rotary electric machines having the same structure as the AC-excited synchronous generator is a wound-rotor induction motor. Even though such a wound-rotor induction motor is connected directly with the power system 33 without any means for improving current waveform connected between them, the induction motor seldom affects the power system 33 adversely since the induction motor does not supply power to but receives power from, the power system 33.

Sixth Embodiment

Figure 13:
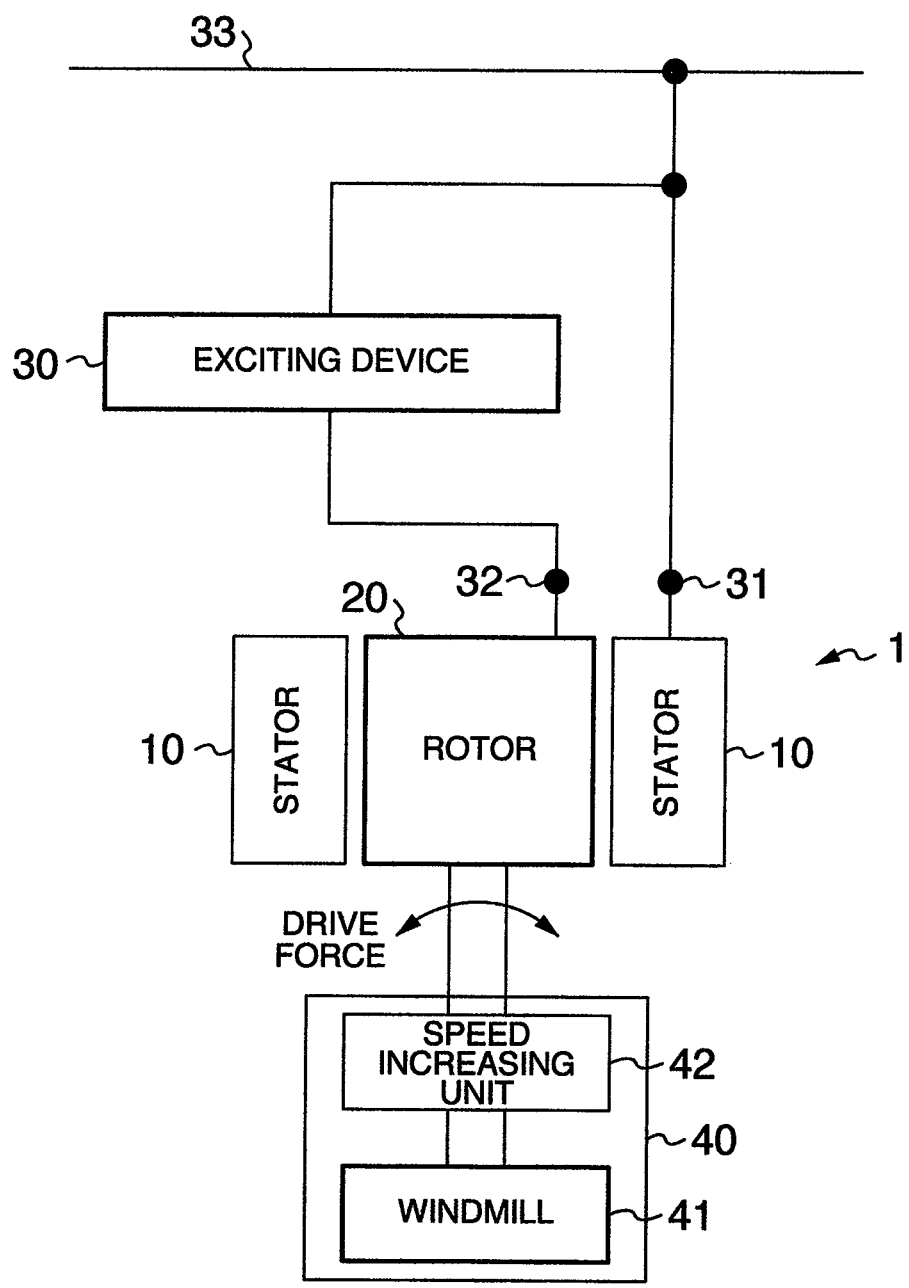
FIG. 13 schematically shows the entire structure of a wind-driven AC-excited synchronous generator system according to the sixth embodiment.

The sixth embodiment will now be described. FIG. 13 schematically shows the entire structure of a wind-driven AC-excited synchronous generator system according to the sixth embodiment. The wind-driven AC-excited synchronous generator system according to this embodiment comprises an AC-excited synchronous generator 1, a variable-frequency AC exciting device 30 and a drive power source 40.

The AC-excited synchronous generator 1 used in this sixth embodiment is similar in structure to the AC-excited synchronous generators described in the above first to fourth embodiments, and has an armature winding terminal 31 and a field winding terminal 32. The field winding terminal 32 of the AC-excited synchronous generator 1 is connected with the output terminal of the variable-frequency AC exciting device 30. The armature winding terminal 31 of the AC-excited synchronous generator 1 and the input terminal of the variable-frequency AC exciting device 30 are both connected with a power system 33.

The drive power source 40 used in the sixth embodiment comprises a windmill 41 and a speed increasing unit 42. The speed increasing unit 42 is provided between the AC-excited synchronous generator 1 and the windmill 41. The rotational speed of the windmill 41 is increased by means of the speed increasing unit 42.

Figure 14:
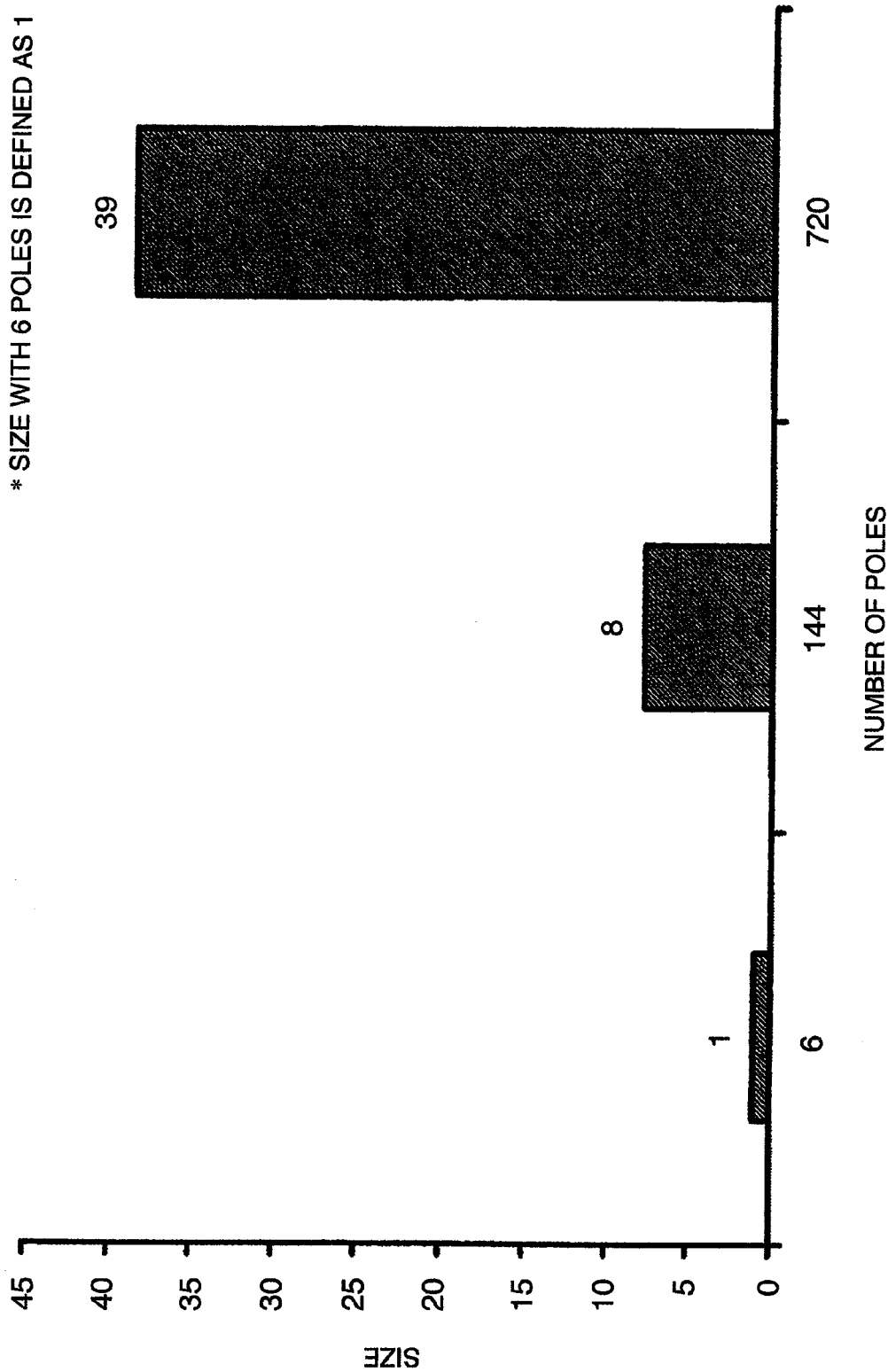
FIG. 14 graphically shows the relationship between the size and the pole number of an AC-excited synchronous generator.

FIG. 14 graphically shows the relationship between the size and the pole number of the AC-excited synchronous generator 1. In FIG. 14, the abscissa represents the number of poles in the AC-excited synchronous generator and the ordinate denotes the size of the AC-excited synchronous generator. It is to be noted here that the size of the AC-excited synchronous generator 1 is normalized relative to the size of an AC-excited synchronous generator having six poles.

In general, the rotational speed of an AC-excited synchronous generator increases as the number of poles decreases. It is therefore understood from FIG. 14 that the decrease in the number of poles can result in the decrease in the size and that the reduction in the size can lead to the reduction in cost.

With an AC-excited synchronous generator having two poles in either of the stator and the rotor, however, acoustic noise from the generator itself and the speed increasing unit 42 becomes considerable so that such a generator is not adaptable for use in a wind power generation system because of the unfavorable impact on the environment. Therefore, if the number of poles is set to 4 or 6, the optimal size for such an AC-excited synchronous generator can be obtained. This optimal size can lead to the reduction of cost, too.

Further, since such an AC-excited synchronous generator 1 as described in the first to fourth embodiments is used in the wind power generation system according to this sixth embodiment, the influence of higher harmonic components on the armature current waveform can be lessened even if the length of the gap between the stator 10 and the rotor 20 is decreased. Accordingly, the size of the AC-excited synchronous generator 1 can be further reduced.

According to this embodiment, the size of the AC-excited synchronous generator 1 can be reduced so that it can be easily placed in a high-raised position such as in the nacelle of a large-scale windmill.

According to the wind power generation system described in the sixth embodiment, stable power that is directly supplied to the power system 33 can be generated by adjusting the voltage and frequency of the output of the variable-frequency AC exciting device 30 connected with the field winding terminal 32 of the AC-excited synchronous generator 1 in response to the change in the rotational speed of the windmill 41, and thereby maintaining the rotational speed of the rotor 20 constant.

As described hitherto, the present invention can provide an AC-excited synchronous generator and an AC-excited synchronous generator system used for wind power generation, in which the distortion of the armature current waveform is suppressed.

Further, according to the present invention, the distortion of the armature current waveform is suppressed so that the influence of higher harmonic components on the armature current waveform can be lessened even if the length of the gap between the stator 10 and the rotor 20 is decreased. Accordingly, the size of the AC-excited synchronous generator 1 can be reduced. Therefore, it can be easily placed in a high-raised position such as in the nacelle of a large-scale windmill.

Moreover, according to the present invention, since the distortion of the armature current wave form is suppressed, the current outputted from the armature winding terminal 31 of the AC-excited synchronous generator 1 can be directly supplied to the power system 33, that current having such a waveform as imposing no adverse influence on the power system 33.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A synchronous generator comprising
a rotor having a field winding placed in the slots thereof and
a stator having an armature winding placed in the slots thereof, wherein a value of $N_1 - N_2$ is equal to ±12, ±18, or ±24, where $N_1$ is a number of slots per two poles in the stator, and $N_2$ is a number of slots per two poles in the rotor,
wherein the field winding is excited by an exciting device and the synchronous generator is an AC-excited synchronous generator in which electric power is generated in the armature winding, and
wherein values of a number of slots per pole per phase in the stator and a number of slots per pole per phase in the rotor are both integers.

2. The synchronous generator as claimed in claim 1, wherein the ratio of the armature winding pitch to the stator pole pitch falls within an interval of 77.8 to 88.9%.

3. The synchronous generator as claimed in claim 1, wherein the ratio of the field winding pitch to the rotor pole pitch falls within an interval of 77.8 to 88.9%.

4. The synchronous generator as claimed in claim 1, wherein the number of slots per two poles in the stator is 30 and the number of slots per two poles in the rotor is 18.

5. The synchronous generator as claimed in claim 4, wherein the number of poles is selected from 4, 5 or 6.

6. The synchronous generator as claimed in claim 1, wherein each rotor slot has a circumferentially asymmetric shape.

7. The synchronous generator as claimed in claim 1, wherein magnetic wedges are provided in the openings of the stator slots and the rotor slots.

8. The power generation system comprising the synchronous generator claimed in claim 1 and a drive power source for rotating the rotor, wherein the drive power source includes a windmill and a speed increasing unit which is provided between the synchronous generator and the windmill.

9. The power generation system as claimed in claim 8, further comprising an exciting device for exciting the field winding, wherein the exciting device can cause the output voltage and frequency thereof to take predetermined values.

* * * * *